United States Patent
Ferguson et al.

(10) Patent No.: US 7,688,323 B2
(45) Date of Patent: Mar. 30, 2010

(54) FUNCTION PORTIONS OF ANIMATION PROGRAM

(75) Inventors: Stuart Harl Ferguson, Sunnyvale, CA (US); Bradley Warren Peebler, San Francisco, CA (US); Joe Angell, Jay, VT (US); Matthew Craig, San Mateo, CA (US); Gregory Duquesne, Bordeaux (FR); Eric A. Soulvie, San Mateo, CA (US); Allen David Hastings, Los Altos Hills, CA (US)

(73) Assignee: Luxology, LLC, Mountain View, CA (US)

( * ) Notice: Subject to any disclaimer, the term of this patent is extended or adjusted under 35 U.S.C. 154(b) by 0 days.

(21) Appl. No.: 11/186,200

(22) Filed: Jul. 20, 2005

(65) Prior Publication Data

US 2006/0158450 A1   Jul. 20, 2006

Related U.S. Application Data

(60) Provisional application No. 60/589,997, filed on Jul. 20, 2004, provisional application No. 60/590,886, filed on Jul. 22, 2004, provisional application No. 60/599,993, filed on Aug. 9, 2004.

(51) Int. Cl.
*G06T 13/00* (2006.01)
*G06T 15/70* (2006.01)

(52) U.S. Cl. ........................... 345/473; 345/949
(58) Field of Classification Search ................. 345/419, 345/420, 423, 428, 429, 441, 442, 467–470, 345/473, 474, 475, 606, 643, 949; 707/102, 707/103

See application file for complete search history.

(56) References Cited

U.S. PATENT DOCUMENTS

| 5,594,856 | A  | * | 1/1997  | Girard ........................ 345/473 |
| 5,731,821 | A  | * | 3/1998  | Girard ........................ 345/474 |
| 5,736,991 | A  | * | 4/1998  | Tada .......................... 345/474 |
| 5,818,463 | A  | * | 10/1998 | Tao et al. .................... 345/473 |
| 5,854,634 | A  | * | 12/1998 | Kroitor ....................... 345/473 |
| 5,877,777 | A  | * | 3/1999  | Colwell ....................... 345/473 |
| 5,912,675 | A  | * | 6/1999  | Laperriere ................... 345/473 |
| 5,969,721 | A  | * | 10/1999 | Chen et al. ................... 345/419 |
| 6,011,562 | A  | * | 1/2000  | Gagne et al. ................. 345/473 |
| 6,144,385 | A  | * | 11/2000 | Girard ........................ 345/424 |
| 6,154,222 | A  | * | 11/2000 | Haratsch et al. ............. 345/473 |
| 6,304,264 | B1 | * | 10/2001 | Chen et al. ................... 345/419 |
| 6,317,130 | B1 | * | 11/2001 | Ishikawa et al. ............. 345/473 |
| 6,320,988 | B1 | * | 11/2001 | Yamaguchi et al. ......... 382/276 |
| 6,326,972 | B1 | * | 12/2001 | Buhler et al. ............... 345/474 |

(Continued)

*Primary Examiner*—Amare Mengistu
*Assistant Examiner*—Aaron M Guertin
(74) *Attorney, Agent, or Firm*—Gordon & Rees LLP

(57) ABSTRACT

The present invention consists of an evaluation engine, which is a system for evaluating the state of an animation at a specific time where secondary animation may be derived from the state of the animation at another time. Unlike DAG-based systems where time is another variable, time is external to the evaluation engine so that it can easily evaluate alternate times and even entire simulations. It also comprises meshes which support instancing and edge weights, and which employ and extensible system of polygon types to support subdivision surface approximation using a set of bi-quadratic patches which solve quickly. The meshes can also be animated by the evaluation engine using a mesh stack, which has multiple evaluation paths for quickly computing mesh attributes without performing a full evaluation.

15 Claims, 14 Drawing Sheets

U.S. PATENT DOCUMENTS

| | | | |
|---|---|---|---|
| 6,373,492 B1 * | 4/2002 | Kroitor | 345/473 |
| 6,577,315 B1 * | 6/2003 | Kroitor | 345/473 |
| 6,762,757 B1 * | 7/2004 | Sander et al. | 345/420 |
| 6,989,834 B2 * | 1/2006 | Ostermann | 345/473 |
| 7,365,752 B2 * | 4/2008 | Xie | 345/560 |
| 7,391,420 B1 * | 6/2008 | Coyne | 345/473 |
| 2001/0020943 A1 * | 9/2001 | Hijiri et al. | 345/473 |
| 2001/0026278 A1 * | 10/2001 | Arai et al. | 345/474 |
| 2002/0093503 A1 * | 7/2002 | Nougaret et al. | 345/474 |
| 2003/0160791 A1 * | 8/2003 | Breton et al. | 345/473 |
| 2003/0231182 A1 * | 12/2003 | Park et al. | 345/474 |

* cited by examiner

FUNCTION PORTIONS OF ANIMATION PROGRAM

PRIORITY

This application claims the benefit of priority of U.S. provisional application Ser. No. 60/589,997 filed Jul. 20, 2004, U.S. provisional application Ser. No. 60/590,886 filed Jul. 22, 2004 and U.S. provisional application Ser. No. 60/599,993 filed Aug. 9, 2004 all of which are incorporated herein by reference in there entirety.

FIELD OF THE INVENTION

The present invention relates generally to the field of computer animation software.

BACKGROUND OF THE INVENTION

Computer animation has become a common feature of our shared media landscape. From cartoons and games to NASA artist conceptions and even courtroom forensic re-creations, computer animation is familiar to everyone and is a large and growing business. The software used to create these animations all have to solve some common problems: generating realistic and pleasing motions, efficiently generating surfaces and meshes, and rendering those surfaces into frames. Although many prior art methods have been implemented for doing these things they all suffer from some common drawbacks.

Prior art surface mesh implementations are hindered by requiring costly destructive edits during animation, and being unable to get high-quality subdivision surfaces by a fast method of approximation that supports polygons of any order. They are also unable to compute the attributes, such as bounding box, of a deformed mesh without performing the deformation. A better mesh implementation would be one that could be edited without having to destroy the original, and would have a method of approximating the limit surface of a subdivision control mesh quickly and with control over edge sharpness.

Animation in the prior art never treats time correctly. Since high-end animation requires that many secondary motions be computed algorithmically based on the primary motions designed by the animator, and since some of these computations require knowing the state of the animation at previous or future times, it's necessary for animation systems to handle these cases in a logical and consistent manner. Instead prior art systems employ ad hoc methods that can be limited or introduce errors from feedback loops. An ideal animation engine would treat time as an intrinsic quantity to fully support time-warping expressions and dynamic simulations. If it made it easier for the animator to insert and manage these secondary animation effects that would be even more ideal.

3D rendering in the prior art is never fast enough. All prior art solutions have problems dealing with large amounts of geometry and getting high quality results from a limited number of render samples. All renders have to trade off quality because they cannot take enough samples or because they spend too long shading the samples needed for good clean edges. What is needed is rendering software that can take more samples and still run faster by using better partitioning of large data sets, and by doing less shading while still getting good anti-aliasing.

SUMMARY OF THE INVENTION

The present invention allows users to overcome many of the drawbacks of the prior art. It consists of an evaluation engine, which is a system for evaluating the state of an animation at a specific time where secondary animation may be derived from the state of the animation at another time. Unlike DAG-based systems where time is another variable, time is external to the evaluation engine so that it can easily evaluate alternate times and even entire simulations. It also comprises meshes which support instancing and edge weights, and which employ and extensible system of polygon types to support subdivision surface approximation using a set of bi-quadratic patches which solve quickly. The meshes can also be animated by the evaluation engine using a mesh stack, which has multiple evaluation paths for quickly computing mesh attributes without performing a full evaluation. All attributes of the scene, including meshes and gradients, are subject to algorithmic modification.

It also comprises new methods for rendering large data sets, including independent frame and bucket accumulation passes. These passes use adaptive sample merging so that the expensive shading computation is done as infrequently as possible, while the two-level geometry cache allows more geometry to be searched more quickly. These advances allow for more accumulation passes for better anti-aliasing without sacrificing speed of shading.

The foregoing, together with other features and advantages of the present invention, will become more apparent when referring to the specification, claims and accompanying drawings.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DETAILED DESCRIPTION OF THE DRAWINGS

Figure 1:
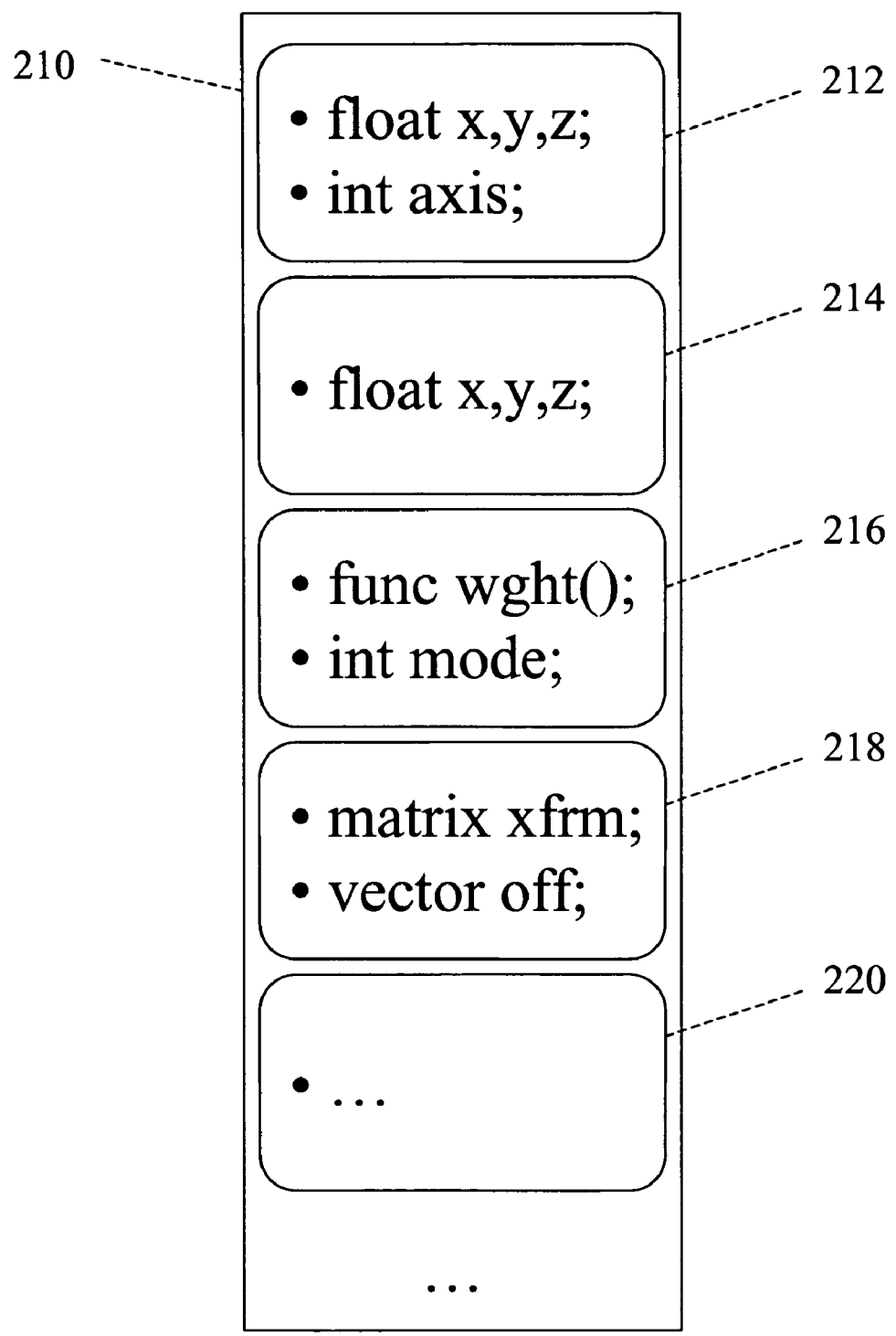
FIG. 1 illustrates a sample vector in a preferred embodiment of the present invention.

FIG. 1 illustrates a sample vector 210 in a preferred embodiment of the present invention. A vector consists of a variable collection of packets that are each identified by a type and can have different kinds of contents, so the packets which make up the vector are heterogeneous. The contents of a packet in the vector might be three (3) floating point numbers, an integer, etc, depending on the needs of each packet type. Specific sample vectors may be composed of different collections of packets with specific values. The sample vector 210 is used for passing data through a series of processing steps. As an example, the sample vector 210 can be utilized in a tool pipe, which contains a collection of tool-specific information such as an axis packet 212, a center packet 214, a falloff packet 216, a transform packet 218 and any other tool packet 220 which the application or any of its component tools could utilize. For example, the sample vector is used when processing the input from the user as when the user is clicking and dragging items. Prior art systems do not utilize general sample vectors. Referring again to the example of the tool pipe, the subject of the user's tool interaction using the pipe are in a sequence, so there is a center tool, an axis tool an element falloff and then an action such as transform. It is called a pipe because raw data is put in one end and processed data comes out the other end. The tools process data in the sample vector in a sequential manner, one at a time. The tools specify what part of the sample vector they work on by listing of those packets that they require as input (or optional input) and those they can generate as output. So the center tool reads the event packet and writes the center packet, the axis tool reads the event packet and writes the axis packet, etc., and the action usually reads the whole set of tool packets and alters the mesh as a side effect. Packets do not have a predefined order, and when each tool gets the sample vector it can read and write all the packets, but it only sees the changes written by the tools before it.

Figure 2:
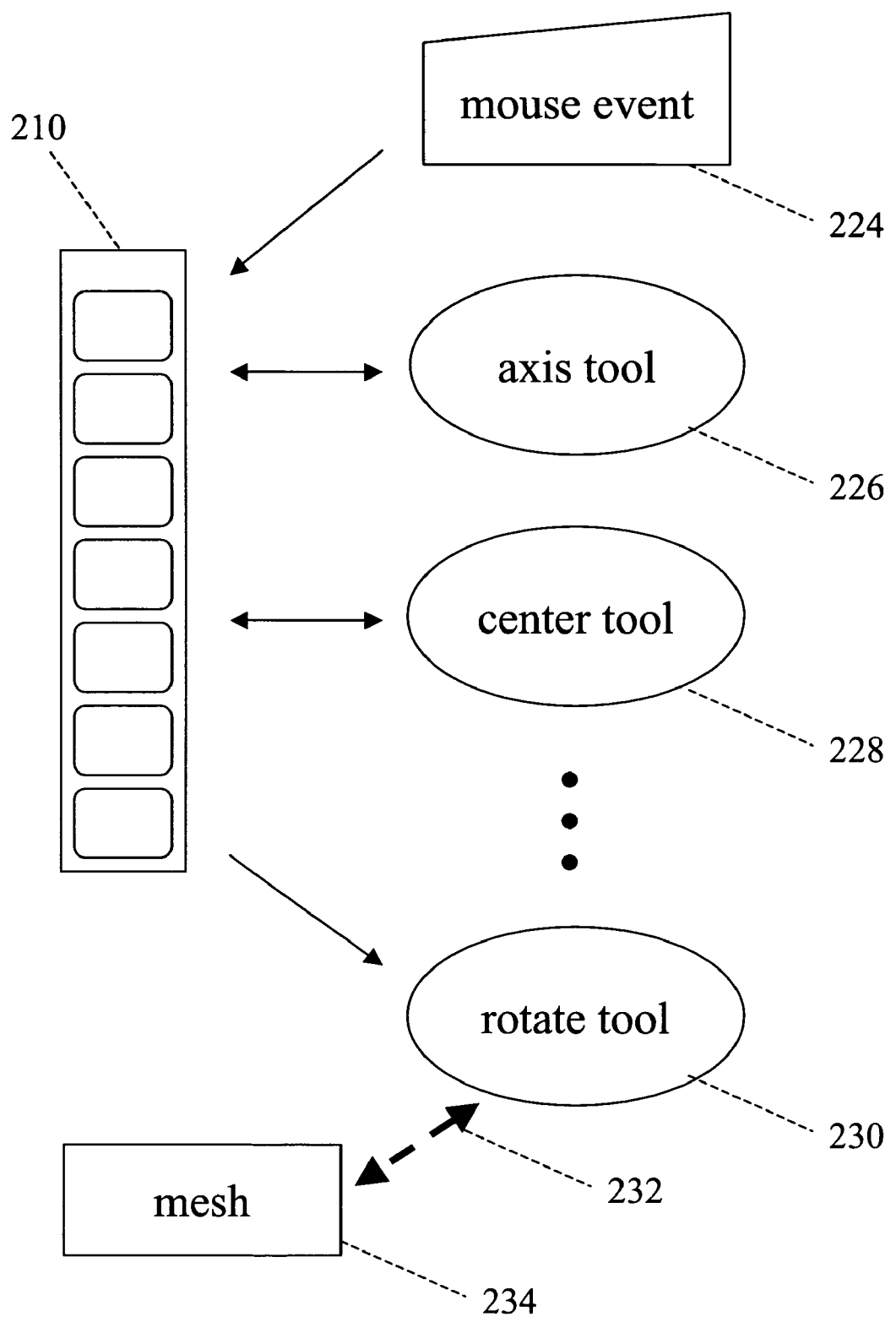
FIG. 2 illustrates the sample vector of FIG. 1 as it is utilized in an application.

FIG. 2 illustrates the sample vector of FIG. 1 as it is utilized in the application to process a mouse event 224. For example, if the user wants to utilize the tool pipe to perform a rotation in the screen axis, then the axis tool 226 and center tool 228 are set to screen and the action tool 230 is set to perform a mesh edit operation 232 that rotates the mesh 234. As the user spins the 3D view around, the user may operate on different axes based on the direction that the user is looking at the model. The rotate tool 230 doesn't know anything about how to compute its own rotation axis, all it does is read the axis packet in the sample vector and whatever was set in the vector by previous upstream elements is used for the rotation axis. When the user clicks the mouse to rotate the mesh, the tool pipe processes the input and performs the composite action. First the mouse event data is fed into the sample vector, including the screen location of the event. Next the axis tool reads the event packet from the sample vector and computes the 3D axis which it writes to the axis packet. Then the center tool reads the event packet and writes the center packet, and so on for all the tools in the pipe. Finally the rotate tool reads the center and axis and combines that with its own angle attribute to perform the rotation. The user can change the pipe, for example, by changing the axis tool to a selection axis tool so that now the tool operates by rotating around the axis of the user selection. If the user selects something and then does a rotate, the reconfigured tool performs the rotate now using the same rotate tool but with a different axis tool that sets the axis based on the selection, as defined by the selection axis tool. Essentially the user is building up an entire functional tool by composing reusable parts together. The key innovations in this invention are: 1) tools can function cooperatively by using this same abstract vector as a kind of shared blackboard, and 2) the packets can be extended. So if someone used the application of the present invention and used its third-party software development kit (SDK) and added a new type of tool, they could create their own entries in a sample vector; they could process them any way they wanted to and it would work within the tool because it is a general mechanism. If there is a tool in the pipe, any of them can specify which packets in the vector they want to read and write. By looking at that, the system knows what sorts of things need to be active and how they will interact without needing special knowledge of the contents of third-party packets. Although the sample vector here is used to process interactive input, it has applications in other areas as well such as any sequence of heterogeneous modules processing an extensible collection of data.

Figure 3:
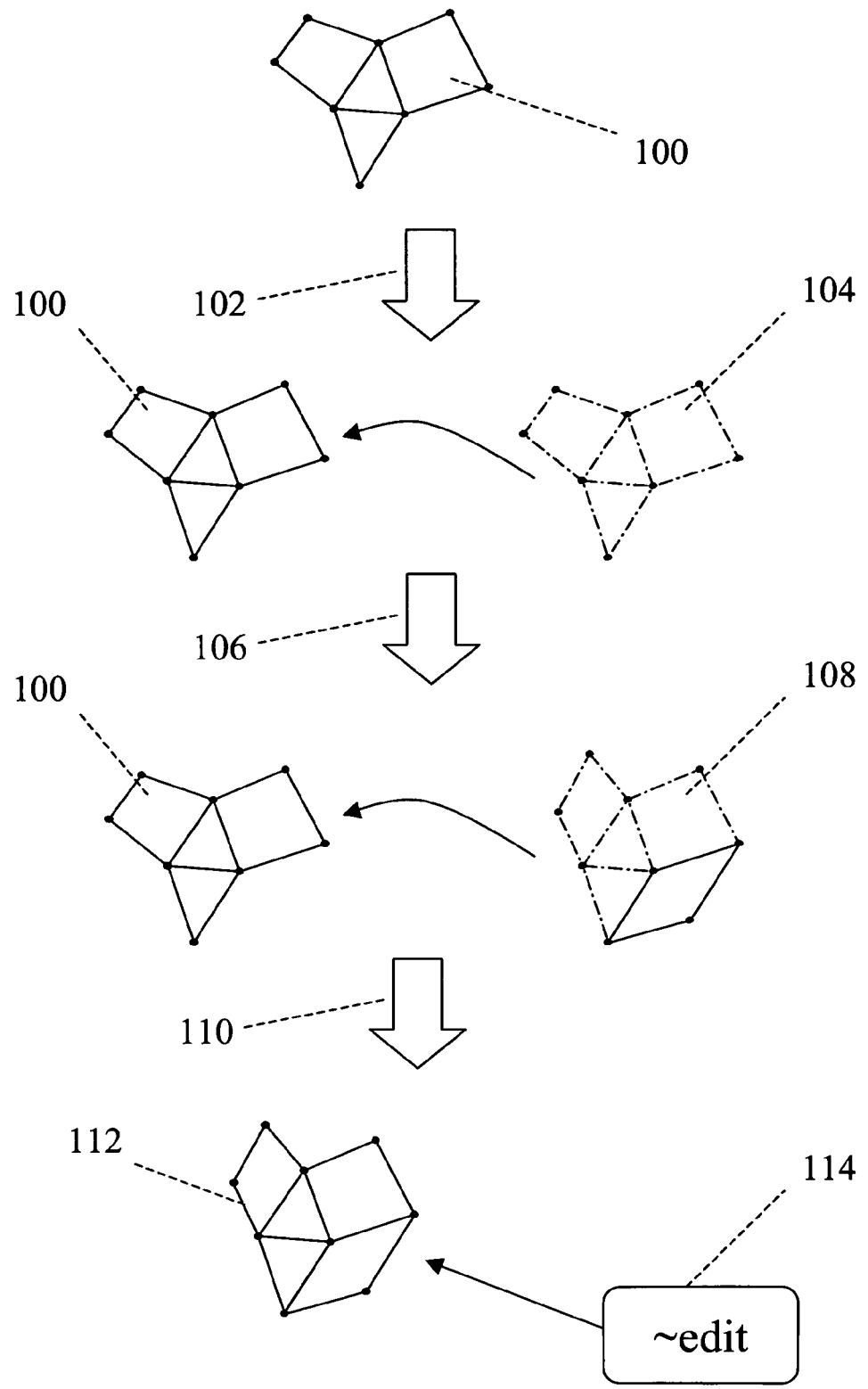
FIG. 3 illustrates an example of the process of using a mesh instance for undoable edits.

The meshes in the system consist of points and polygons. The problem with prior art systems is that mesh data structures are modified in situ, so the original mesh is destroyed in order to transform it into the new mesh configuration. To have the original mesh and the modified mesh at the same time prior art requires making a copy of the original mesh, which can be expensive. In the present system, an instance mesh is created in order to make edits. An instance mesh is logically the same mesh and shares most of the same basic data, but the system can modify parts of it without affecting the original. The original mesh stays intact, but the client can create versions of it that have a different shape or topology. This is useful because a lot of memory is saved since the description of the mesh doesn't need to be completely duplicated; the only thing stored is the differences. The exact same mechanism is also utilized for performing undoable editing on a mesh, a process illustrated in FIG. 3. To make an undoable change to a mesh 100, an instance is first created 102. The instance 104, which refers back to the original mesh to get everything that it contains that is unchanged, can then be edited 106, in this case moving some points and adding a polygon. A merge operation 110 is then performed which applies the differences from the instance to the original mesh and creating a modified version of the mesh 112. This also stores the differences as an undo action 114 that can reverse the changes to the mesh if the user wants to later. This is also useful if the change operation fails partway through since the partial changes can be quickly discarded by deleting the instance without affecting the original mesh. Using vertex maps to store vertex positions is one of the technologies that allow the system to make instances which deform a base mesh.

Figure 4:
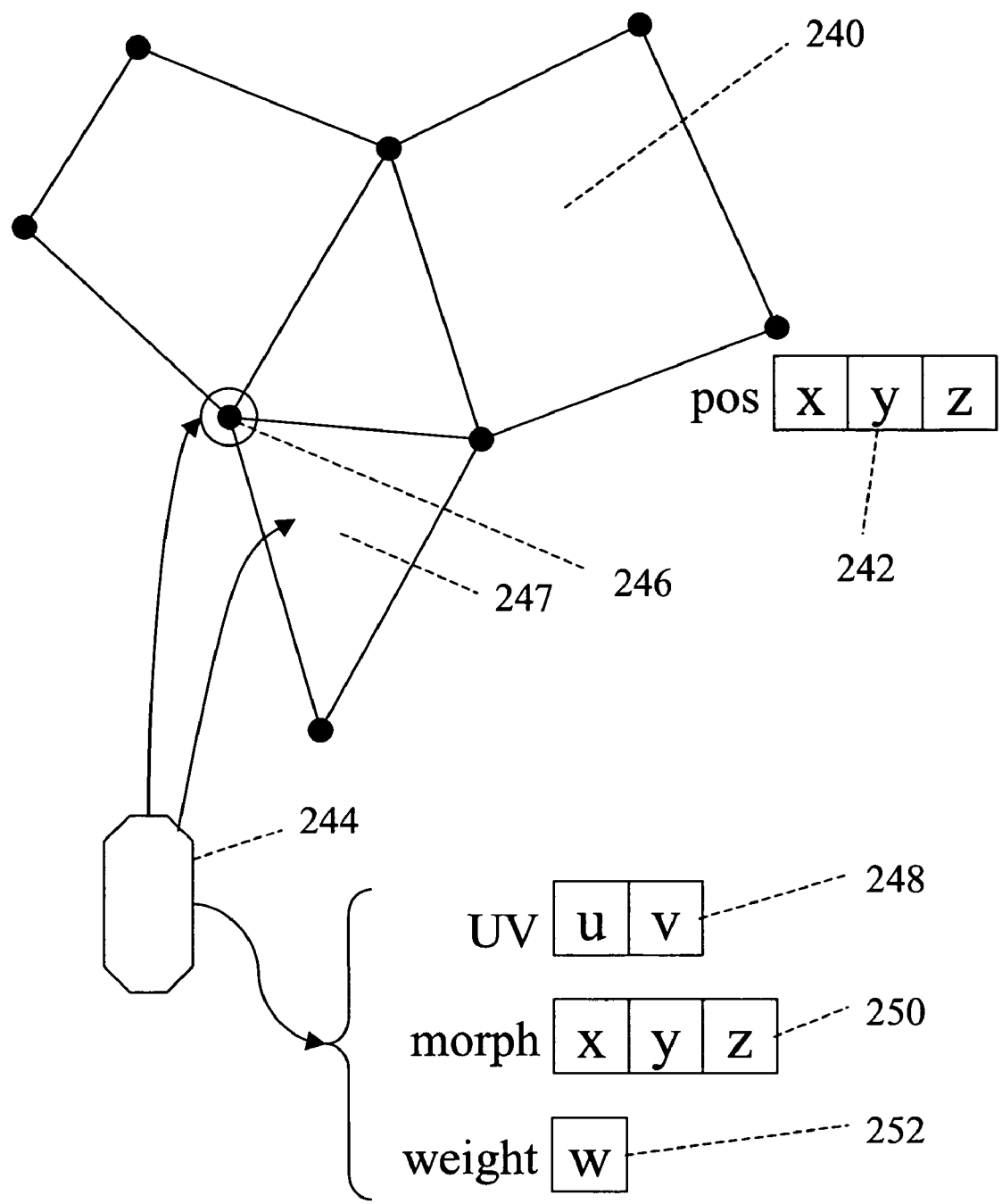
FIG. 4 illustrates an example of a prior art vertex map.
Figure 5:
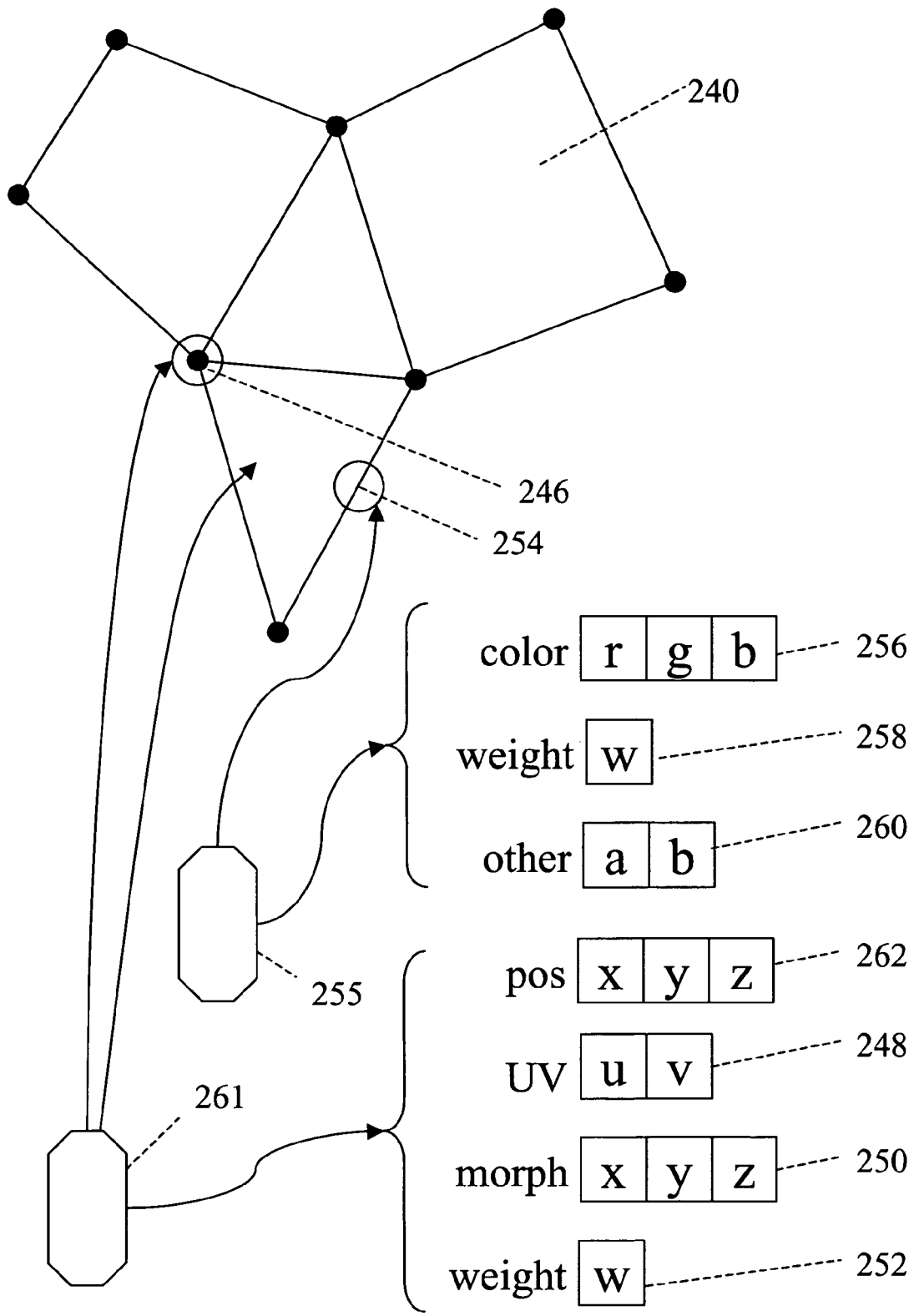
FIG. 5 illustrates an example of a the vertex map that has position and edge vectors.

FIG. 4 illustrates an example of a prior art vertex map of a mesh 240. On every vertex 246 of the mesh an arbitrary number of arbitrary dimension floating-point vectors are stored. The prior art vertex maps 244 comprise associations between the vertices of the mesh and vectors in the map. The vectors may include UV vertex map positions 248 (which are the locations in UV space for the vertices), a morph vertex map offset 250 (which are the deltas or alternate positions for the mesh points, i.e. a different shape), and weight vertex map values 252 (which modulate other effects, such as deformations, over the mesh). Vertex maps may also store associations for vertices of a specific polygon 247. In the prior art, the vertex map does not comprise a vertex position 242—that vector is stored as an intrinsic property of the vertex. Turning to FIG. 5, an example of a vertex map 261 that contains the vertex position 262 is illustrated. As in the prior art vertex map, there is a UV map coordinate 248, the morph vertex map offset, and a weight vertex map value 252. Unlike the prior art, the vertex map 261 of the present invention also includes the positional vertex map coordinate. Furthermore, the present invention includes an edge map 255 for associating value vectors with edges, such as edge 254, in the mesh. For example the edge map could contain a color edge map triple 256 (which could be used by a cel shader to color edges) and a weight edge map value 258 (which could be used for edge sharpness in a smoothed model). These map vectors are for illustration purposes only, as the system supports any number and type of vectors in the vertex or edge maps, as illustrated by other edge map pair 260 which has been defined by the user for any purpose they might want. Unlike prior art systems, the system of the present invention treats position the same as everything else, as something that is associated with vertices using a vertex map. As result, deforming the mesh can be done by simply adding or changing the positional vertex map.

As described earlier, meshes consist of vertices and polygons. Vertices are handles for vertex maps, which encode vertex position as well as other values. Polygons are lists of vertices plus a type. For example, a face type polygon might have four vertices and would look like a flat rectangle. The face polygon contains a pointer to an interface which the system uses to extract information about the shape and shading for the face polygon. The system can also change the polygon's type to be something different by simply changing this type pointer, so a patch for example would be the same four vertices but the system would treat it differently by virtue of the different interface and it would appear smoothed. The system can also create curves that way. The polygon contains a list of vertices that define the curve, but it is a curve type polygon. Unlike the prior art systems, the system of the present invention has the ability to extend this through the SDK, so any third-party or customer could create a new polygon type. Some of the ideas for polygon types are dimension lines, so if there are two vertices, the system could draw this as a dotted line with arrows and a distance, and angle indicators that would draw a center, radius and angle if there were three points. A patch polygon type could put together curves into a smooth surface that could also be another single polygon type. Prior art systems have polygon types, but they cannot be extended, and have not been implemented in the manner described in these examples.

Figure 6:
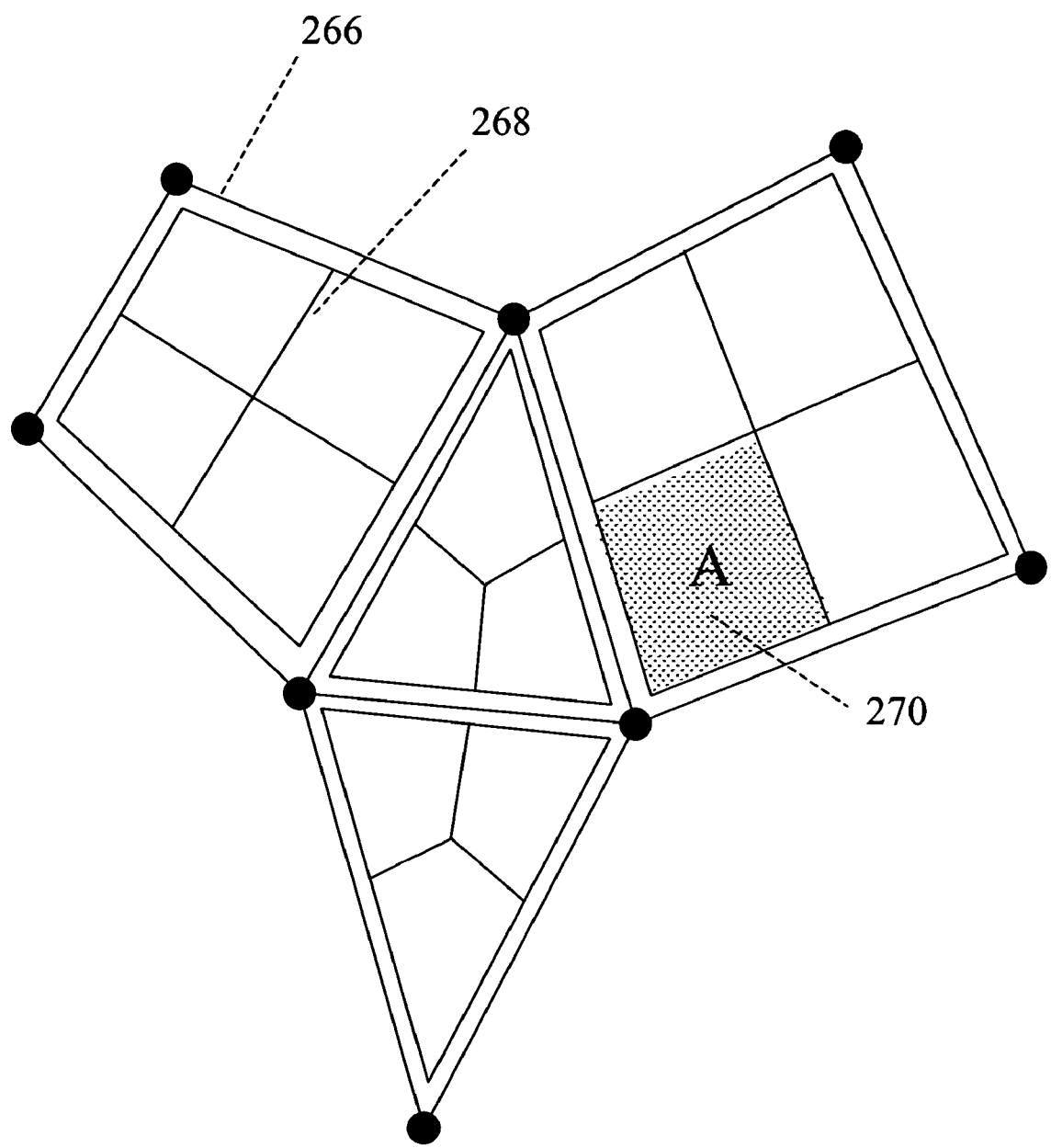
FIG. 6 illustrates an extensible polygon type with several subdivision surface polygons.
Figure 7:
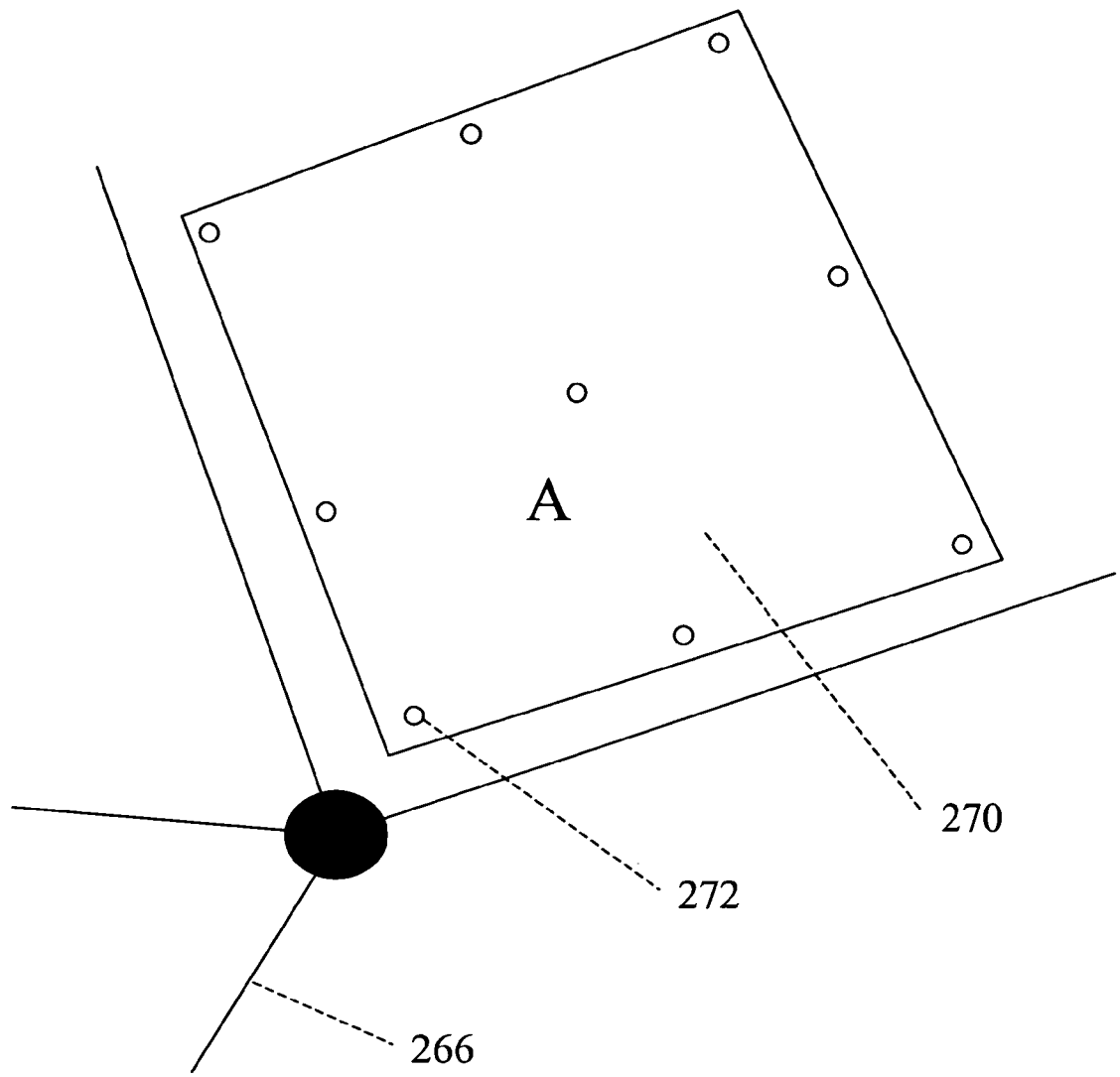
FIG. 7 illustrates a square in the subdivision that has 9 control points.

The system of the present invention computes the shape of subdivision surfaces differently than prior art systems in that the system generates a mesh of approximating bi-quadratic patches. Other prior art software employ patches to approximate the limit surface, but they are not bi-quadratic, and they do not support cage polygons with more than 4 sides or fewer than 3 sides. The mesh of subdivision surface polygons acts as a control cage 266. See FIG. 6. The first step in the computation breaks the subdivision cage into quads 268 where each of the four quads is a bi-quadratic surface patch 270. There will be as many four-sided patches in the subdivided mesh as there were sides in each original cage polygon, so a quad creates four patches and a triangle creates 3 and so on. For each one of the patches there are 9 control points 272, with the control points along edges and at vertices shared between adjacent patches. See FIG. 7. The basic algorithm for computing the cage control points starts with a single level of Catmull-Clark subdivision to get CC positions for the corner of each patch. The position of the central control point of the patch is the average of the four CC points for the patch. The control point at the center of each edge is computed by averaging between the central control points of the two patches on either side of the edge. Finally the corner control points are computed by averaging the edge points around them. These 9 control points determine a bi-quadratic patch 270, which in a uniform quad grid will smoothly interpolate the surface. At extraordinary points—that is any vertex in the mesh where there are more or fewer than 4 edges coming together—it doesn't perfectly approximate, so there is a very slight seam which is removed during rendering by smoothing the surface normals across either side of the seam.

The basic algorithm described above is modified by edge weighting. An edge map stores a weight value at each edge between −1 and 1. If the weight is 0, the system does the unmodified algorithm as described above so it is a smooth surface. If the weight is non-zero the rules for computing control points are modified so that if the mesh contains a closed edge loop with a weight of 1, it appears as though there is a hard seam along that loop. This is equivalent to breaking the control mesh into two parts along the seam and solving them separately. Values less than 1 still interpolate smoothly across the surface but approach the sharp seam in the a limit. Values less than 0 cause the seam to be flatter rather than sharper. Some prior art systems support positive edge weights for sharp edges, but none support negative edge weights. The weight modifications are as follows. Computing one level of CC subdivision:

1) Central point average of polygon cage points as normal.
2) Edge points computed as a weighted average of the face points and the cage endpoints. At w=−1 we use only face, w=1 we use only edge, and w=0 uses an equal balance.
3) Corner points are a weighted average of the smooth solution Vs, the sharp edge solution Vp using the two edges with the highest weights, and the original cage point Va. We first blend Va and Vs by the average weight of the edges other than the two chosen for Vp. Then we blend in Vp by the difference between the second and third strongest edge weights (Wp).

Computing the patch control points:
1) Center point is biased toward the edges of the original control cage with a weight greater than 0 and away if less than 0. −1 to 1 on each outer edge allows the center point to range over the entire area of the quad.
2) Edge point is a weighted average of the adjacent face points based on Wp.
3) Corner point is a weighted average of three values analogous to case 3 in the CC subdivision immediately above.

Figure 8:
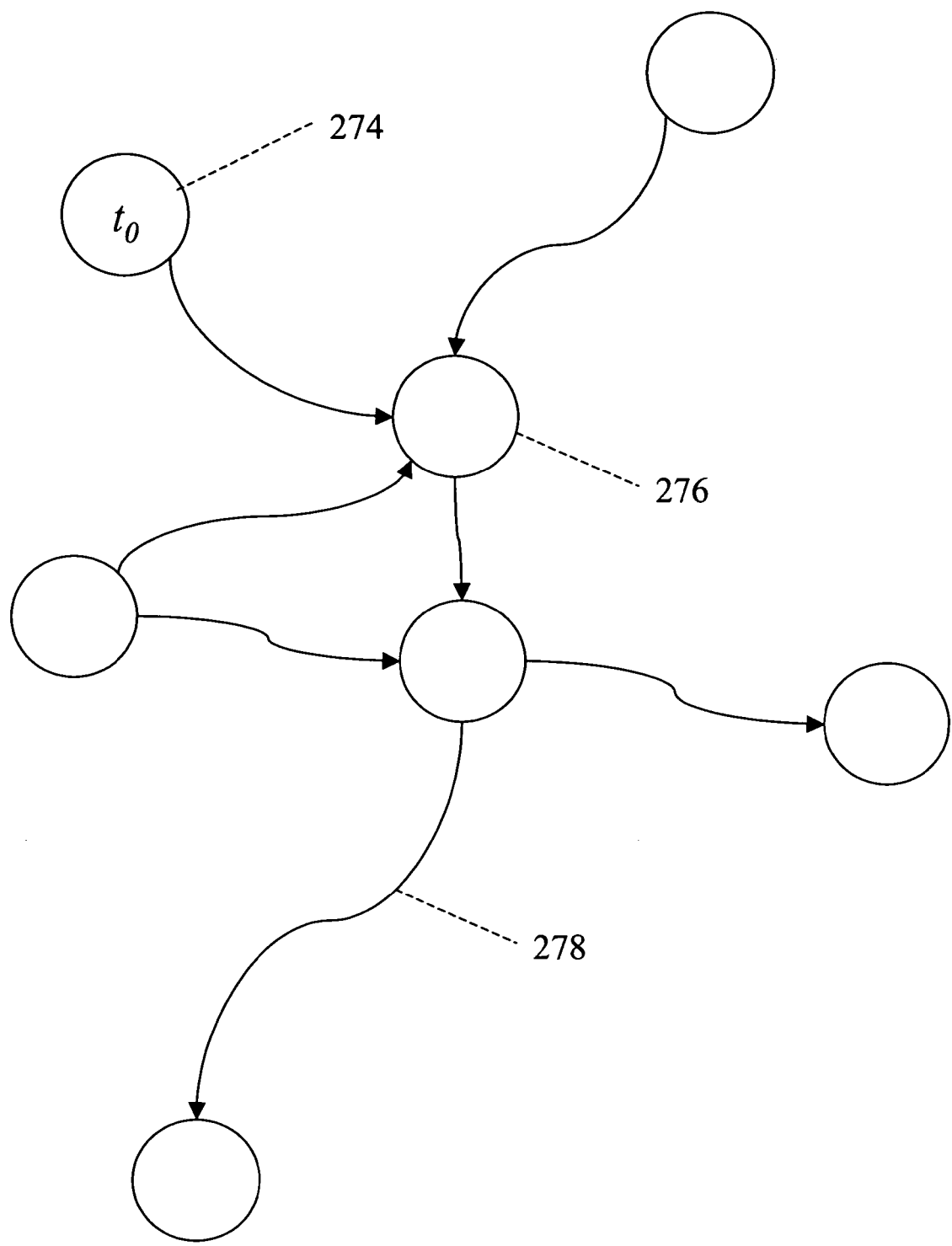
FIG. 8 illustrates a prior art DAG.

The system of the present invention utilizes an evaluation engine, which is a method for computing the current state of any complex evolving system. The evaluation engine is designed for animation, but it can be utilized for other things as well. In animation the problem is how to allow the user to specify the movement and behavior of items and elements over time, including computed secondary motions not set using key frames. Some prior art systems handle this by building a directed acyclic graph (DAG) which contains a set of nodes 274, 276 connected together by a set of arcs 278; data flows from one node to another node along these arcs. Each node is a container for some aspect of the animation state, computed by synthesizing the inputs to the node, and which can be passed along to any other node that needs it for its processing. See FIG. 8. So if user wants the output meshes or positions or anything of that type, then the nodes in the DAG are the sources for them. One of the inputs nodes in the DAG is typically the current time 274 (a significant limitation), another input is some set of control curves, one node takes the time and evaluates the curve at that time, yet another reads those values from that node and outputs a deformed mesh, etc. Each of these nodes does something and each of the arcs carry data from one node to another and the final outputs are what end up in the animation. These prior art systems are efficient and very general, but the problem is that this is a very difficult thing for the user to manage because user has a difficult time wrapping their mind around how things are connected together, or if they can, it is a life long career. The other thing that is bad about these DAGs is that user can't easily graft new information into them or remove something temporarily; DAGs tend to be inflexible and brittle.

Figure 9:
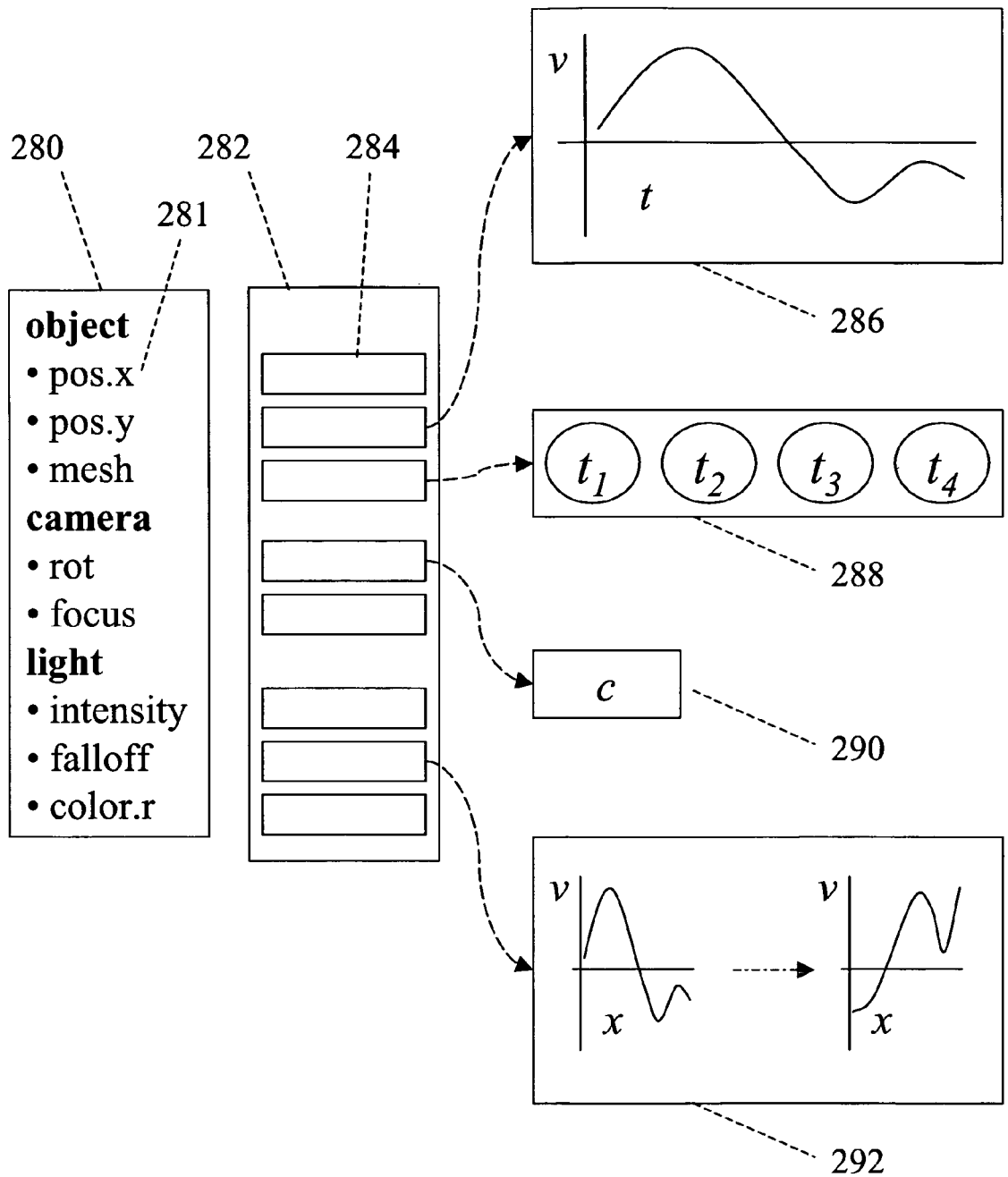
FIG. 9 illustrates an action definition and its components.

The system of the present invention replaces the inscrutable DAG with a more simple database that consists of a set of items 280 illustrated in FIG. 9, which are the things in a scene. For example, one of the items might be a light, one might be the ground, one might be a camera, one might be an object such as a right leg of a character, etc. These items all have channels 281, which are the parameters of the objects and which have values 284 contained in an action database 282. For example if there is a light, it will have channels for its position, its intensity, its falloff, its R,G,B color, etc—all the different values that control exactly what that light is doing. The job in animation is to get those values to evolve over time so that the user gets exactly the image in each frame of film, and motion between frames, that is desired. The way this is done in the present invention is to start with a basic motion definition which defines values for the channels over the time span of the animation. For example in the time varying value 286 (for the channel defining the y position of the object) the system stores how the value changes over time as a curve which maps time to a value. The curve indicates something changing over time and that's what effects the position, in this case moving the object up and down. The user or animator sets these up manually using the user interface and these are the primary animation. FIG. 9 also illustrates how a mesh channel could be a time sequence of objects 288, a rotation channel could be a constant 290 that doesn't change over time, and a falloff channel could be a time-varying function 292 (which takes distance as input and computes intensity, for example, in a way that is different at different times).

Figure 10:
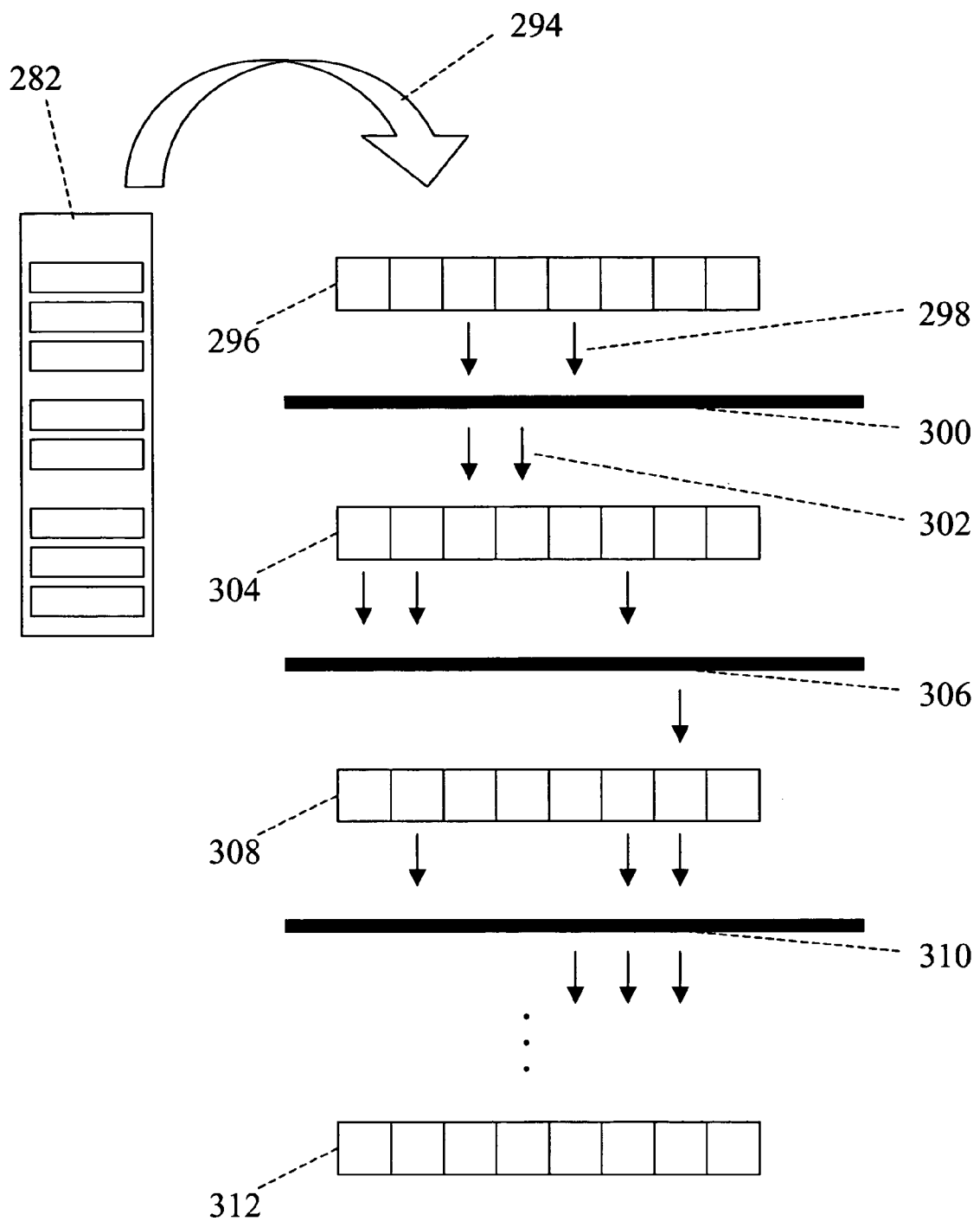
FIG. 10 illustrates the evaluation engine using modifiers in a preferred embodiment of the present invention.

The system of the present invention then utilizes modifiers on the action database 282 to compute secondary animation. See FIG. 10. A modifier is a computational step that is applied to a set of motions or to a set of values, and is essential for any kind of complex animation going beyond what a user or animator could define manually. An example of a modifier would be forward kinematics, which reads the positions of parent items and alters the positions of child items, or inverse kinematics, which reads the position of a target item and alters the position and rotation of a kinematics chain to reach the target. The system can use as many modifiers as is necessary, and which modifiers are present in a given animation is determined implicitly by the items in the database. If the user wants a certain special effect they add an item for it, and the item adds an appropriate modifier to the evaluation engine. At the start of the evaluation process, the action database first goes through an action evaluation process 294 to produce an initial state vector 296. The time-varying values in the action are evaluated at the current time and stored in the vector as constant (or functional, or object) values. The values of channels in the initial state vector 296 are read 298 by the first modifier 300 and the first modifier writes values 302 creating a first modified state vector 304. Any values which are not written by the modifier move unchanged from the first state vector to the next. Next the second modifier 306 reads the values from the first modified state vector 304 and writes values creating a second modified state vector 308. The third modifier 310 reads the values from the second modified state vector 308 creating another modified state vector. This process continues until the final state vector 312 is achieved and the system uses the values of the channels in that state vector to compute the rendered frame. Conceptually this is very similar to the sample vector and the tool pipe, since the animation state vector and the sample vector are both arrays of heterogeneous data objects, and both the evaluation engine and the tool pipe perform a linear sequence of transformations over their corresponding vectors. The packets read and written by each tool in the tool pipe are known in advance, and some of the same optimizations that can be done during evaluation can be done in the tool pipe and vice versa.

The modifiers serve the role that the processing step in the nodes do in a DAG implementation. As an example, an animator might want to program a particular light to always point at a person's head. The head has an X,Y,Z position and the light has a position and an X,Y,Z rotation, so the user could create an expression item which would create a modifier. The expression (which is a type of script or program, often in the form of an equation) reads the position of the head and the position of the light, computes the angle from one to the other, and writes those out as the X,Y,Z rotation angles of the light. The light does not need to be animated manually to point to the head because the expression will make the light point at the head no matter where the head moves. There can be a whole series of these kinds of things. The system of the present invention can take the sequence of processing steps and connect them up automatically into a grid of dependencies. This internal format can be very quickly evaluated, and all the same optimizations that are available for a DAG evaluating lazily can be applied to the dependency grid for efficient computations of specific values.

What the user sees on the screen is a linear sequence of operations and the user can control the order in which the operations occur very easily; just shuffling the sequence allows the user to control what affects what. For example, say the head position was determined by a person riding in a jeep and the jeep is bouncing up and down, so the head position is determined by the jeep position and a jostling modifier. The light also has a modifier that causes it to point at the head, so if the user places the head-tracking modifier after the jostle modifier then the light will always point right at the head as it jostles. On the other hand imagine the user decides that it should not be done that way and the light should just be focused where the head is before it gets jolted by the jeep's bouncing so the head can move around in a more steady light. All the user has to do to get that effect is to reverse the order of the modifiers, so first the light is pointed at the head, then the head is jostled by the jeep, so the result is a nice steady light and the head bounces along inside that. That is the kind of problem that users, typically animators, solve utilizing a DAG, reconnecting nodes and arcs, making this something happen before that something else. In the present invention, all user has to do is drag and drop and just reorder it; it is a linear sequence which is much more intuitive. Modifiers can also be enabled and disabled very easily, which allows the user to see the effect that each one has and would be a common operation if it weren't so hard to do with a DAG.

It is difficult in a traditional DAG to do something very complicated, for example inverse kinematics (IK). Forward kinematics can be used to position a hand, for example, by setting the joint angles of the arm and the joint angles of the elbow and that determines where the hand is. But if the user is an animator and wants the hand in a particular position, IK can be used to get the hand into a target location by computing that the arm needs to be rotated this way and the elbow this way. Typically all the joints in a character are controlled by IK, so the IK computation may be reading hundreds of positions and setting thousands of angles. In a prior art DAG systems this could be very complex and confusing, but in the present invention the complexity is hidden from the user. The animator may see modifiers for the IK for each character, but they are single objects in the interface that can be reordered, enabled or disabled.

Figure 11:
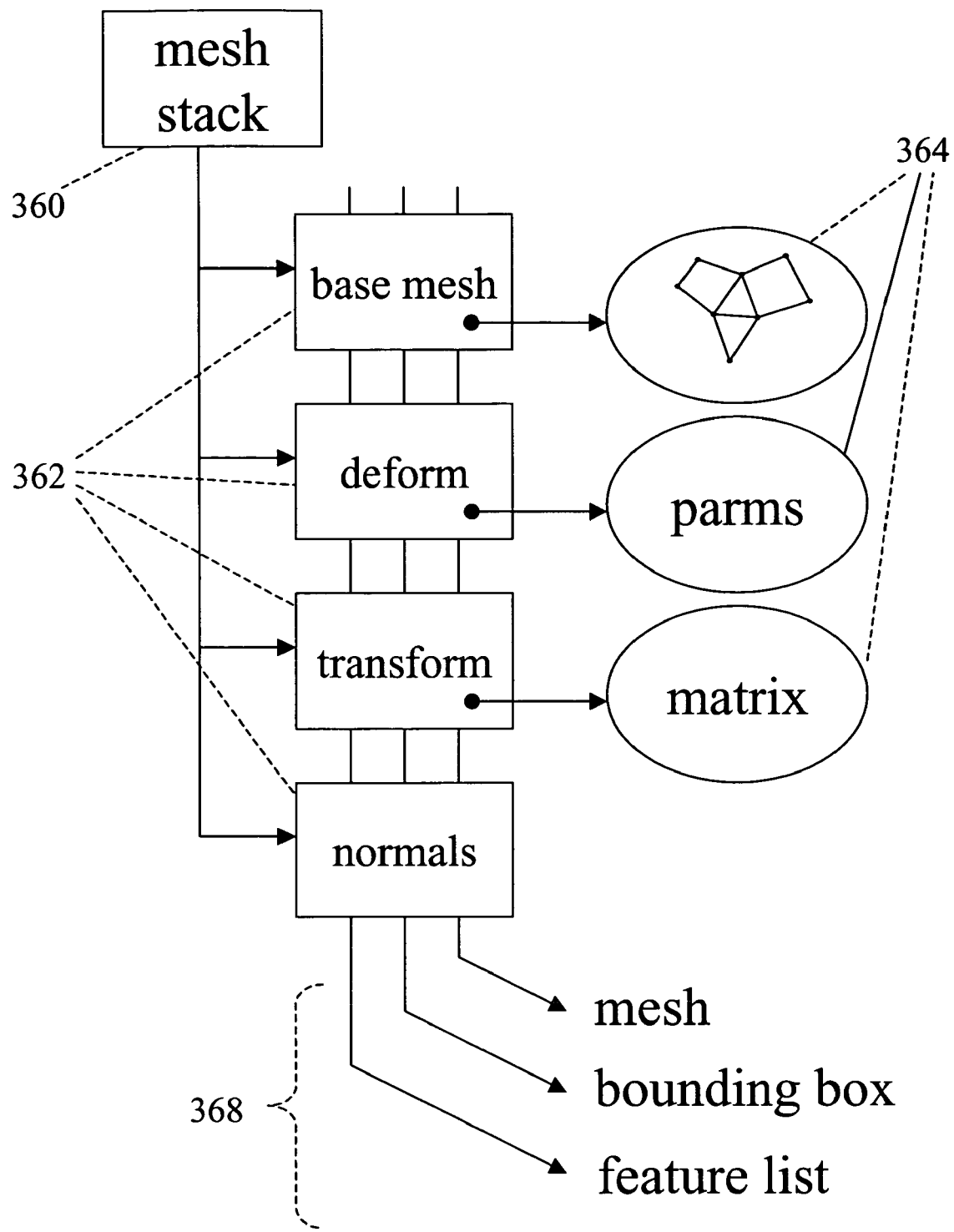
FIG. 11 illustrates a mesh channel utilizing a mesh stack composed of mesh operators.

The channel values in the state vector can be more than just numbers, they can be complicated objects. For example a 3D object has a mesh channel which is an entire mesh and that is read for each time and can be acted on by modifiers just like any other channel. But the system doesn't actually copy the entire mesh to that channel and operate on it anew for every evaluation; that would be far too slow. What the system of the present invention does instead is create a mesh stack 360, kind of a proxy for the mesh which is just the list of operations 362 that are required to be done to this mesh. The first operation is going to copy the base mesh to initialize the channel for evaluation, so an operator is added to the stack which includes a reference to the base mesh 364. The next modifier deforms the mesh, but instead of performing the deformation the system adds a description of the deformation that is going to be performed 364 to the stack. (See FIG. 11.) Likewise another modifier will transform the mesh and it contains a matrix that tells it how the system will do it. And then the final operation computes world normals 368 (a process which does not need any data, but which would still be added by a modifier). The mesh stack is built as the modifiers are evaluated. The modifiers don't actually do any changes to the mesh, the modifiers just say what they would do if there were a mesh. What comes out the end is not the final mesh, but a description of what the system was actually going to do to the mesh. This is essentially like a little slice of the DAG, because those are in essence the nodes and the arcs between them and how those meshes would travel to get to their final stage. When the mesh needs to be drawn the system evaluates the stack, but it will not be evaluated unless it is needed.

The system caches the results of the mesh stack evaluation, so the system doesn't need to completely recompute the whole stack every time. This is done using mesh instancing. The system copies the base mesh to an instance, the deform operation just moves points around, the transform moves the points some more, and the compute normals step adds new vertex maps to it. Once the expensive initial computation is done, the system can then very rapidly update those operations as input parameters change. The system can also evaluate the stack in a more efficient manner than is possible in a prior art DAG through the use of multiple evaluation paths 368. The system can indicate that it doesn't want the entire mesh, but just wants to compute the bounding box instead (the min and max X,Y,Z for the mesh). The system can use the bounding box to ignore meshes that are behind the camera or out of range, and in that case the full mesh evaluation need not be done. The system doesn't have to evaluate the whole stack to compute the bounding box; all the system has to do is look at the bounding box of the base mesh and then let each of these steps say what it would do to the bounding box. For example, the deform operation knows the max deformation that is going to be performed, 3 cm for example—at most the system is going to expand the bounding box that much, so that's what the operator does. It doesn't need to know the exact result to get an approximate bound. The transform just shifts the whole mesh over, so it can simply move the bounding box based on the matrix, and the compute normals step doesn't change it at all, so this is the final bounding box which has been computed without actually having to evaluate the mesh. The system uses multiple evaluation paths for other aggregate mesh properties such as the list of vertex and edge maps. The possible set of evaluation paths is open-ended and can be extended. This is also done with images using image stacks, which are analogous to mesh stacks but perform image filtering instead of mesh operations.

The system of the present invention utilizes gradient channels, which are another type of object that can be used as a state vector channel during evaluation. A gradient channel is a signal like an animation curve, but one whose independent parameter is not time but something else. For example, the falloff or range of a light in 3D space could be defined as a gradient channel—that is a function that computes the intensity at a given distance. These channels can be altered by modifiers in a manner similar to mesh stacks, with a modifier applying their own function as another operation layered on the original function. For example noise could be added or textures with parameters to the light falloff curve. If the user wanted something that was transparent in the middle and opaque at the edges, which are done sometimes for a soap bubble, the user could have the transparency be modulated by incidence angle using a gradient. The transparency is very high in the middle where the incidence angle is 0 and it is very low at the edge where the incidence angle is close to 1. This kind of gradient channel could then be altered by modifiers or animated over time, for example applying a changing exponent as the soap bubble slowly thins and evaporates. Prior art systems with gradients cannot allow them to be transformed in the same process as other animation channels in the evaluation engine, nor can they vary over time.

Figure 12:
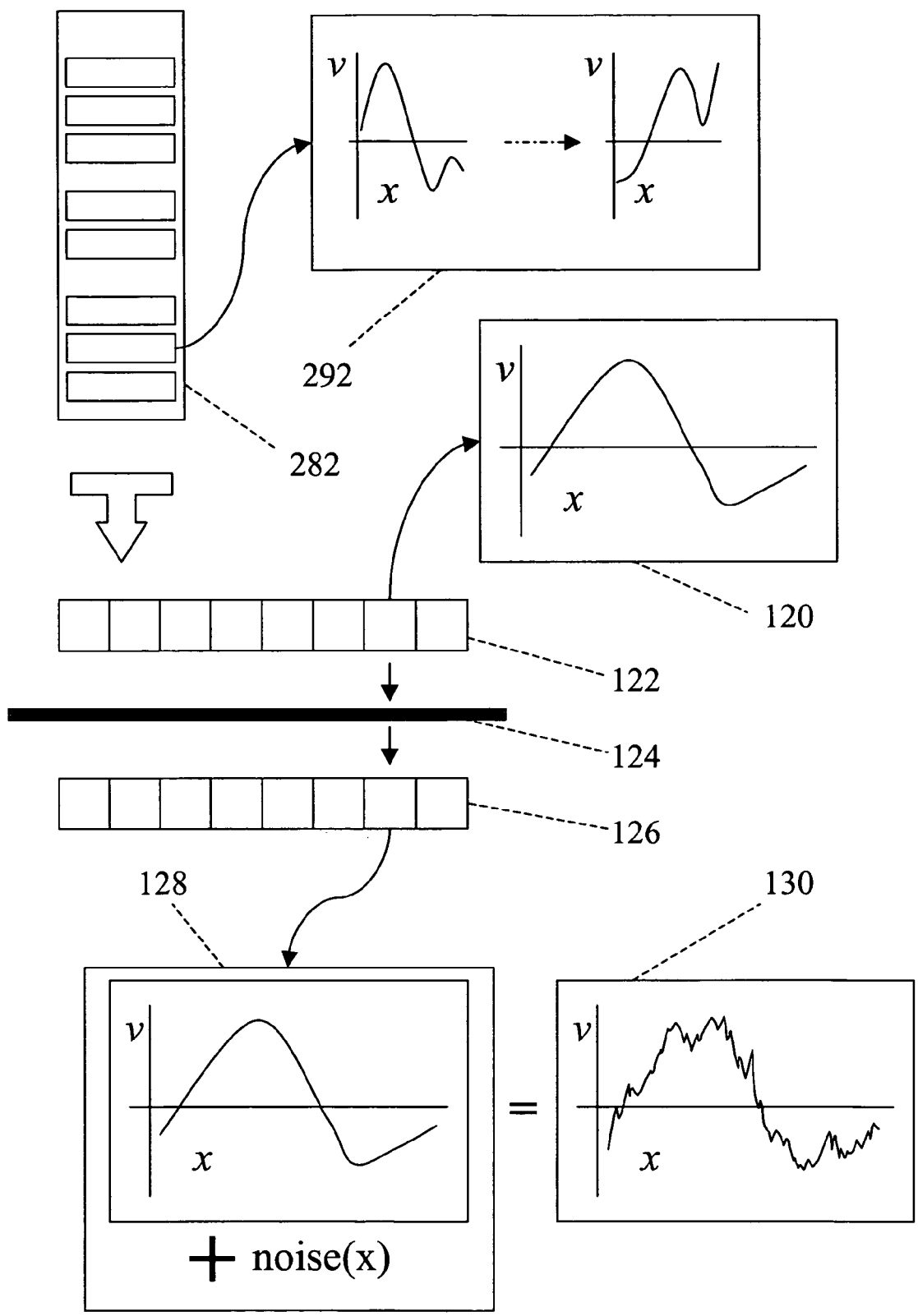
FIG. 12 illustrates a sample gradient channel as it moves though the evaluation.

FIG. 12 illustrates a gradient channel as it evolves through the evaluation process. Gradients are stored in the action 282 as a time-varying function curve, in this case mapping some independent variable x to an output v. When the action is evaluated to compute the initial state vector 122, the gradient is sampled at a specific time, selecting a curve which may have an intermediate shape which is stored as a function 120 in a slot in the state vector. An animation modifier 124 may read that channel, which gives it access to the gradient function. The modifier then writes its own function to that same channel in the new state vector 126. The modified function 128 takes the input function and adds a noise component, so that the resulting signal 130 that would be read from that gradient would be a noisy version of the original gradient. Whatever feature of the image this gradient function controlled would have a noisy appearance instead of a smooth one. The noise function could change with time, but for any given value of x at the current time the noise function has to return the same value.

Unlike the prior art, the system of the present invention can easily look backward or forward in time. As an example consider tracer fire in an action movie. For a gun that is firing at something, tracer bullets leave a bright streak as they fly, but if the gun is moving to track a target then the bullet travels the path it was in when it originally left the gun barrel. So at any given time the bullets closer to the gun will be more aligned with where the gun is now, where the ones out farther from the gun are where they were when they were fired. Computing the position of a bullet at a time $t_0$ depends on looking backward in time, because where the bullet is a time $t_0$ depends on where the gun was pointed at time $t_1$ when the bullet was originally fired. The evaluation engine of the present invention can do that very easily. The tracer bullet modifier is going to position the bullet based on reading the gun position and rotation channels, but it is going to read them at a previous time, so if it's computing the state at $t_0$ and this bullet was fired at time $t_1$, it is going to read the values from time $t_1$ in order to compute and then extrapolate from that to get the position now at time $t_0$. The modifier, called a time-warp modifier, specifies that it wants channel values from a different time. The system then goes to that other time, reads out the values and applies the modifiers in sequence but only up to the tracer bullet modifier itself. This assures that the modifier sees only the changes that come before it regardless of the time of the evaluation. The system can determine that to compute a particular element, only a small part of the grid is needed, not the whole thing, because each modifier says what it is going to read and what it is going to write. A modifier that doesn't affect the desired channels, even indirectly, is not even run. This can be computed easily by tracing the path to see which modifiers are going to read and write the requested channels. There are cases in some prior art systems where, if the user wants to use the output from one time to control the input of another time, the final value at that time is computed and then fed back into the graph at the original time. This can cause very weird feedback effects because the node is essentially affecting itself. The present invention solves this problem by only evaluating a particular subset of the graph—the subset that includes the modifiers that are prior to the requesting modifier in the linear sequence. If a modifier asks for a value at a different time, the system doesn't go through and evaluate all the way through. That is a key solution to time invariance and that is possible because the modifiers are in a predetermined linear sequence.

Figure 13:
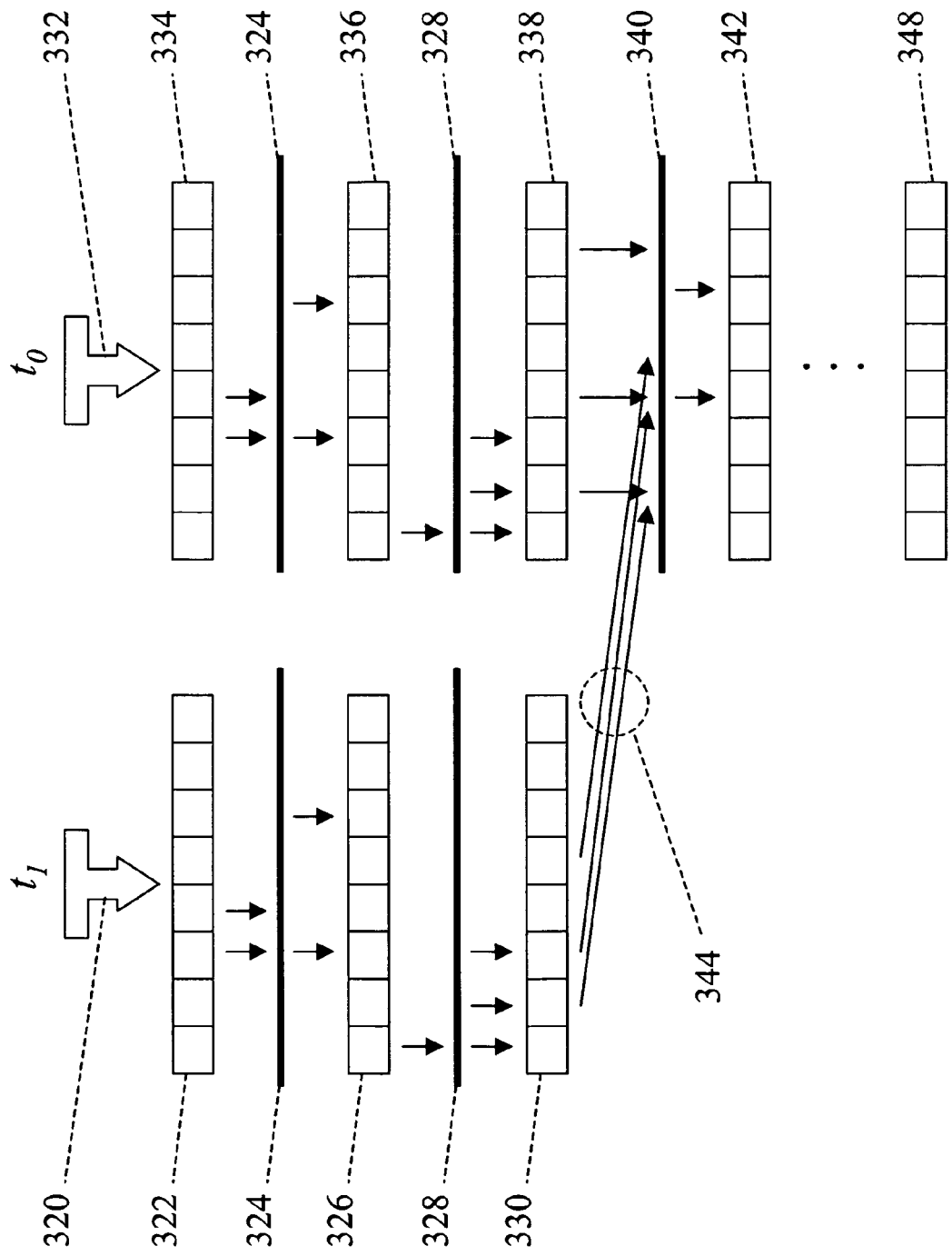
FIGS. 13-14 illustrate evaluation across multiple times using a time-warp modifier in a preferred embodiment of the present invention.

FIG. 13 illustrates computing the output state of an animation at time $t_0$ based on inputs from time $t_1$. This is done using a time-warp modifier 340, which is a modifier that can read not only from the current time but from a different time. This system works by first evaluating the action at time $t_0$ 332 and time $t_1$ 320 to get state vectors 334, 322. The first modifier 324 is applied to both state vectors resulting in new vectors 336, 326. Then the second modifier is applied to both state vectors resulting in new vectors 338, 330. The results from both different times are now fed into the time-warp modifier 340 which performs a computation, perhaps bullet tracer fire, using channels from the current time $t_0$ and from the alternate time $t_1$ 344, resulting in a combined current-time vector 342. This is then processed normally by any other modifiers to get the final animation state 348. The sequence described here is for illustration purposes only, and computational sequence could be altered as long as each step gets the right inputs and outputs. For example, if the time $t_1$ is itself a channel in the computation, the time $t_0$ would have to be computed before the computation at time $t_1$ even began.

Figure 14:
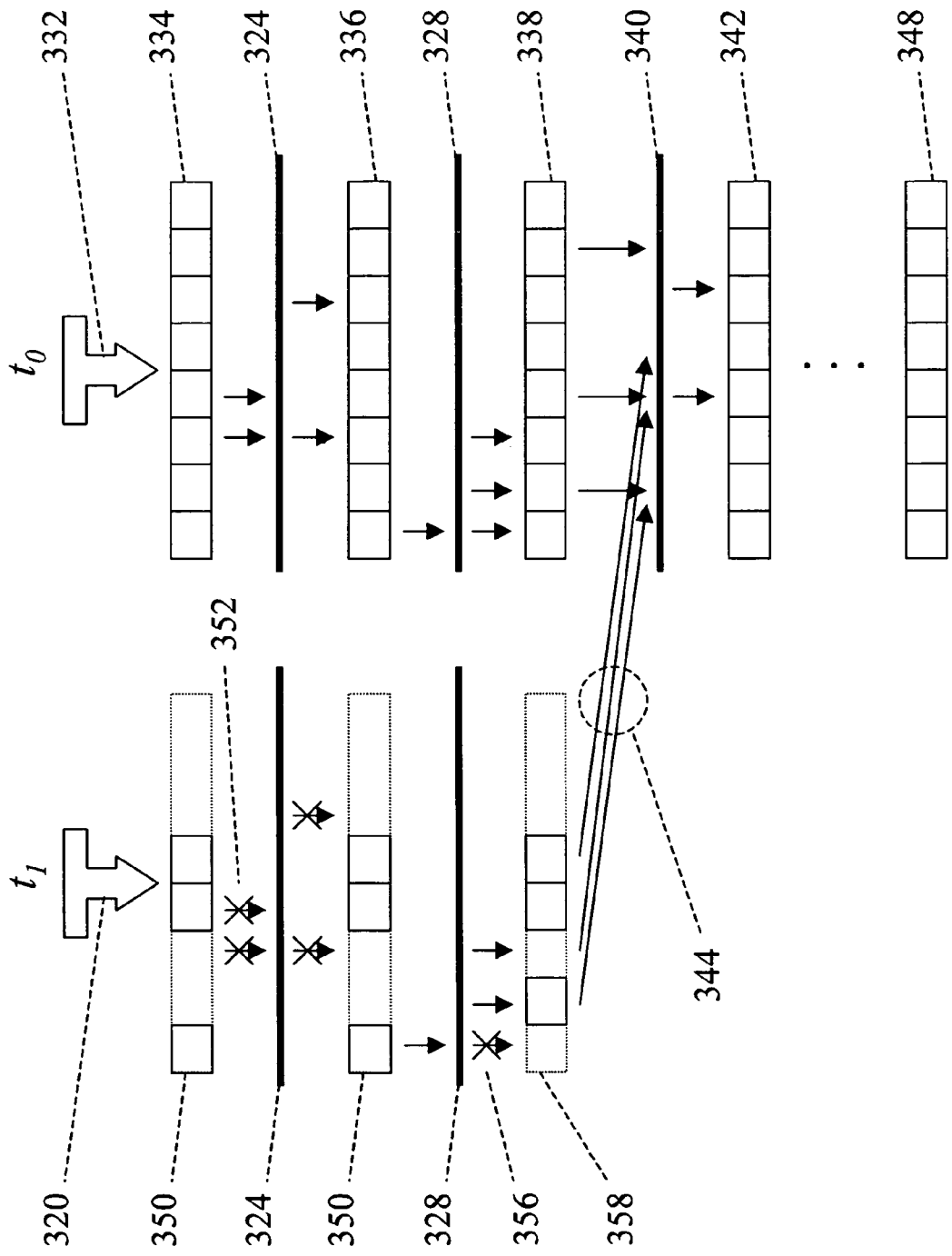

FIG. 14 illustrates the output state of an object at time $t_0$ based on time $t_1$ that has been further optimized to compute only the components of the state vector that are required. The time-warp modifier 340 specifies before any computation is done the subset of channels 344 that it needs. The animation engine propagates this information backwards and determines at each step which channels and modifiers affect the requested outputs. In the optimized evaluation, only those channels needed by the modifiers are extracted from the action at time $t_1$ to get a minimal state vector 350. The first modifier 324 does not output any channels that are required, so evaluation of that modifier is skipped 352 resulting in the same vector being fed into the next modifier. That modifier 328 outputs channels that are not required so they are discarded 356. The resulting minimal state vector 358 can be fed into the time-warp modifier and all the channels that it requires are present without requiring a full evaluation.

The time-independence of the evaluation engine also allows it to be used directly for simulation. Methods to solve the differential equations for dynamics and other numeric simulations useful in 3D animation, such as the Runga-Kutta method, require evaluating the state of the system at several different times simultaneously. Since the evaluation engine can evaluate its state at different times efficiently and without risk of feedback effects, it is ideal for inserting any number or sequence of simulations. For example a toy rocket might be flying up through the air, being propelled by thrust and buffeted by wind. Solving its motion requires knowing the strength of forces at multiple times around each solution time step. Since these few parameters can be computed efficiently based on the modifiers that affect them, the solution is quickly computed. Once the motion of the rocket over time is known, it can be used as input to a particle simulation that draws the rocket thrust. The particle simulation would be a later modifier, so it would not affect the rocket's motion, and it can be solved second as an independent and fast step. The system of the present invention treats simulations as a general case, and solves them sequentially by running them forward in time and capturing their output using a step size and interval specified by the modifier. The first simulation modifier is solved completely first, then the second modifier is solved using the captured output of the first as its input, and so forth.

The accumulation buffer method achieves effects like anti-aliasing, motion blur, and depth of field by performing multiple rendering passes and averaging the results. This process can be improved by dividing it into two levels. The higher level "Frame Passes" involve evaluating the scene database for a particular time and rendering the entire image as a tiled mosaic of rectangular "Buckets". Each Bucket is rendered independently (possibly by different threads or computers) using a series of "Bucket Passes". The scene database does not need to be completely reevaluated for each Bucket Pass since motion vectors can be used to update geometry, light, and camera transformations. Bucket Passes can also be limited to semi-regular subsets of the pixels in the Bucket to lessen the banding artifacts often seen in accumulation buffer renderings, giving an effect more like stochastic sampling. Using more Bucket Passes and fewer Frame Passes (possibly just one) results in faster rendering, since fewer expensive full scene database evaluations are required. On the other hand, using more Frame Passes allows motion blur to take into account more complex changes (such as velocities or topologies that vary during the frame time). In this case the number of Bucket Passes can be reduced, since antialiasing quality depends on the total number of passes used for each pixel.

Polygonal geometry can be stored in a multi-level hierarchy using different types of data structures at different levels. Large sets of polygons with common material properties are stored in "Surfaces". Within each Surface, smaller neighborhoods of polygons are stored in "Segments". To accelerate rendering algorithms such as ray tracing or frustum culling, all Surfaces are organized in a binary space partitioning (BSP) tree, and Segments are organized in a BSP tree within each Surface. Because the extents of polygons in a single Segment typically overlap, they would have to be members of multiple nodes if organized in a BSP tree, so instead a bounding volume hierarchy within each Segment is used to organize its polygons. At the beginning of rendering, only the high level BSP tree of Surfaces is created. The lower level hierarchies are created lazily when the bounding box of their parent Surface or Segment is intersected by a ray or frustum. This mixed representation results in faster rendering than homogeneous hierarchies, since the most advantageous structure is used at each level. Another benefit is reduced memory consumption, since the structures within unseen Surfaces and Segments are never created, and Surfaces or Segments that have not been used recently can be purged from memory.

The most time-consuming part of photorealistic rendering is computing the shading (including the texturing and lighting) of a surface or volume sample. Multiple samples taken at different positions within each pixel are needed for antialiasing purposes, but rather than shading each sample independently and storing the results, the raw input data needed for shading (including material IDs, world and texture coordinates, and surface normals) can be stored instead, with shading computations deferred until all samples have been generated. Before this deferred shading is performed, similar samples within a pixel can be merged (averaging their data), potentially greatly reducing the number of shading computations required. Samples are merged if they share material IDs and if certain other criteria are met, such as surface normals matching within a specified tolerance. To improve the antialiasing of hard texture or shadow edges, a second shading pass can be performed, revisiting pixels that exhibit high contrast with their neighbors and reshading them with less (or no) merging of their samples. This adaptive method thus preserves high quality antialiasing while still reducing shading costs. It's also possible to use different degrees of sample merging for different parts of the shading process. For example, high density texture computations could be combined with low density indirect lighting by merging samples only after texturing.

Although an exemplary embodiment of the invention has been described above by way of example only, it will be understood by those skilled in the field that modifications may be made to the disclosed embodiment without departing from the scope of the invention.

We claim:

1. A method of rendering a frame of items in a scene of an animation at a current time, the method comprising the steps of:
   (1) calculating a state vector at a current time, by:
   (a) providing a database of items in a scene, the database comprising channels corresponding to parameters of the items, wherein the parameters of the items have user-defined values;
   (b) evaluating the channels at the current time to determine initial values of the channels;
   (c) writing the initial values of the channels to an initial current time state vector, the initial current time state vector comprising an array of heterogeneous data packets; by:
   (i) reading the initial current time state vector with a first modifier;
   (ii) computing modified values of the channels with the first modifier;
   (iii) writing the modified values of the channels to a second current time state vector, wherein values which are not written by the first modifier remain unchanged between the initial current time state vector and the second current time state vector; and
   (iv) using a computer algorithm to repeat steps (c)(i) to (c)(iii) with successive modifiers, wherein the state vector created in step (c)(iii) is input into step (c)(i);
   (2) calculating a state vector simultaneously for an alternate time, by:
   (a) providing a database of items in a scene, the database comprising channels corresponding to parameters of the items, wherein the parameters of the items have user-defined values;
   (b) evaluating the channels at the alternate time to determine initial values of the channels at the alternate time;
   (c) writing the initial values of the channels to an initial alternate time state vector, the initial alternate time state vector comprising an array of heterogeneous data packets; by:
   (i) reading the initial alternate time state vector with a first modifier;
   (ii) computing modified values of the channels with the first modifier;
   (iii) writing the modified values of the channels to a second alternate time state vector, wherein values which are not written by the first modifier remain unchanged between the initial alternate time state vector and the second alternate time state vector; and
   (iv) using a computer algorithm to repeat steps (c)(i) to (c)(iii) with successive modifiers, wherein the state vector created in step (c)(iii) is input into step (d)(i); and then,
   (3) applying a time warp modifier to the current time state vector and the alternate time state vector to create a final combined current time state vector, wherein the time warp modifier reads both the current time state vector and the alternate time state vector such that the values of the channels in the final combined current time state vector are computed using the state of the items both at the current time and at the alternate time; and then
   (4) computing a rendered frame of the items in the scene for the combined current time state vector.

2. The method of claim 1, wherein the value of at least one of the channels is a fixed value.

3. The method of claim 1, wherein the value of at least one of the channels is a varying value.

4. The method of claim 1, wherein the first modifier is one of a plurality of modifiers whose order of application is rearrangeable by the user drag and drop.

5. The method of claim 1, further comprising the steps of:
   (i) creating a mesh stack of mesh operations in the state vector;
   (j) copying a base mesh to initialize the mesh stack; and
   (k) adding at least one mesh operation to the mesh stack.

6. The method of claim 5, wherein the at least one mesh operation is added by evaluation of a modifier.

7. The method of claim 5, wherein the mesh stack is evaluated using the steps of:
   (l) copying a value from the referenced base mesh;
   (m) executing the at least one mesh operation; and
   (n) repeating execution for all of the mesh operations.

8. The method of claim 7, wherein the evaluation yields a mesh.

9. The method of claim 7, wherein the evaluation yields a bounding box.

10. The method of claim 1, wherein the channels are gradient channels.

11. The method of claim 1, wherein the values of the channels are read at least one alternate time in addition to a current time.

12. The method of claim 1, wherein the step of evaluating can be optimized by only extracting the channels needed by the at least one modifier.

13. The method of claim 1, wherein step (c) is optimized by skipping evaluation of modifiers that do not affect desired output channels.

14. The method of claim 1, wherein the values of the channels are computed by simulation.

15. A method of computing a rendered frame of an item in a scene at a current time based on a state of the item at the current time and a state of the item at an alternate time, the method comprising:

providing an item in a scene, the item comprising a plurality of channels, wherein each channel is a parameter of the item;

providing a user-defined primary animation of the item at the current time, wherein the primary animation maps values of time to values of the plurality of channels of the item;

generating a secondary animation of the item at the current time by:

evaluating the primary animation of the item at a current time to compute initial values of the plurality of channels, and then writing the initial values to an initial current time state vector;

evaluating a primary animation of the item an alternate time to compute alternate initial values, and then writing the alternate initial values to an initial alternate time state vector, wherein the primary animations at the current and alternate times are calculated simultaneously;

applying a first modifier to the initial current time state vector to create a modified current time state vector, wherein the first modifier computes modified values from the initial values and writes the modified values to the modified current time state vector;

applying a first modifier to the initial alternate time state vector to create an modified alternate time state vector, wherein the first modifier computes alternate modified values from the initial alternate time values and writes the alternate modified values to the modified alternate time state vector;

applying a time-warp modifier to the modified current time state vector and to the modified alternate time state vector to create a combined current-time vector, wherein the time-warp modifier computes output values from the modified current time values and from the modified alternate time values and writes the output values to the combined current-time vector; and computing a rendered frame of the item in the scene based on the output values in the combined current-time vector;

wherein each modifier is a computational step applied to the channels to compute secondary animation at the current time.

* * * * *